Dec. 13, 1938.   E. E. THATCHER   2,140,192

HOLE SAW BLADE

Filed July 15, 1936

INVENTOR.
Edward E. Thatcher,
BY Hood & Hahn.
ATTORNEYS.

Patented Dec. 13, 1938

2,140,192

UNITED STATES PATENT OFFICE 2,140,192

HOLE SAW BLADE

Edward E. Thatcher, Indianapolis, Ind., assignor to E. C. Atkins & Company, Indianapolis, Ind., a corporation of Indiana Application July 15, 1936, Serial No. 90,655

2 Claims. (Cl. 77—69)

My invention relates to improvements in hole saws and particularly to improvements in a removable blade for hole saws.

In this type of saw, there is usually provided a holding member adapted to receive an annular saw somewhat in the nature of a split ring, and it is the object of my invention to provide a hole saw blade which, when clamped in position, will insure the adjacent ends of the saw remaining in the same plane so that where the split occurs, one portion of the saw cannot be offset slightly from the other portion.

For the purpose of disclosing my invention, I have illustrated an embodiment thereof in the accompanying drawing, in which.

Figure 1:
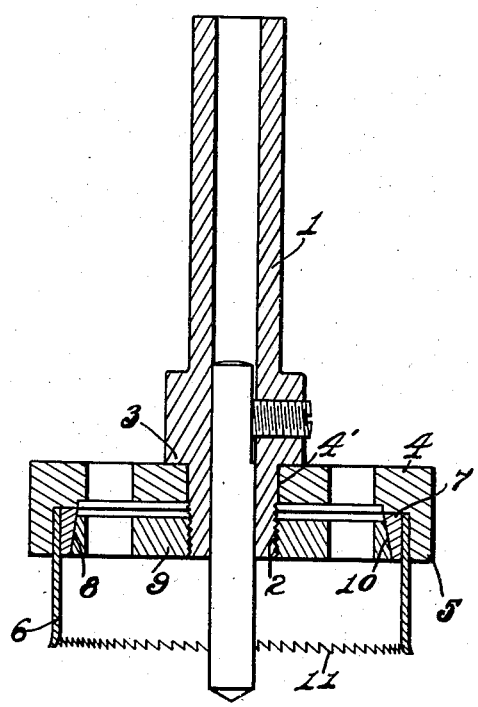
Fig. 1 is a longitudinal sectional view of a hole saw holder adapted to receive the type of saw constituting my invention.
Figure 2:
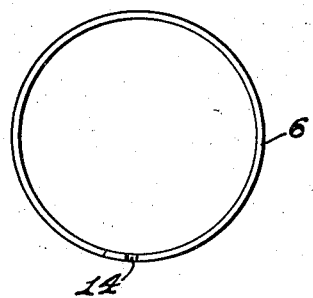
Fig. 2 is a plan view of the hole saw blade.
Figure 3:
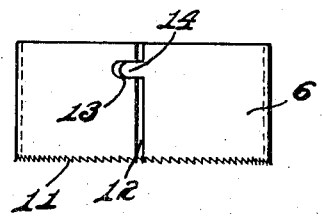
Fig. 3 is a side elevation thereof.

In the embodiment of the invention illustrated, I provide a preferably hollow spindle 1 which may be inserted in a drill chuck or other suitable operating device. This spindle, at its lower end, is screw-threaded as at 2 and above the screw-threaded portion, I provide an annular shoulder 3. The saw-receiving clamp comprises a head 4 having an opening 4' adapted to fit over the stem 2 and abut against the annular shoulder 3. This head 4 has a peripheral flange 5 within which is arranged to be seated a hole saw blade 6. A split clamping ring 7 bears against the inner-face of the blade 6 and the inner-face of this ring is beveled as at 8. A clamping nut 9 is threaded upon the threaded portion 2 and the outer face of this nut is beveled as at 10 to cooperate with the beveled face 8 and cause the ring 7 to clamp the saw blade 6 in position.

The saw blade 6 is preferably made circular in form, having at its bottom edge, suitable cutting teeth 11. This blade is in the form of a split ring being split as at 12 so that the blade may expand against the annular shoulder 5. In order to maintain the adjacent edges of the blade in interlocking position so that the cutting surface will be continuous, one of the edges is provided with a recess 13 adapted to receive a tongue 14 formed on the opposite edge. This recess and the tongue are somewhat elongated so that irrespective of the spread of the blade, when it is inserted in position, the adjacent edges will be locked by the tongue and recess against relative vertical displacement, thus insuring a smooth or continuous cutting edge 12 without any offset portions.

I claim as my invention:

1. A hole saw blade comprising an annular split ring blade having cutting teeth on one edge, one of the adjacent edges of the split ring having a recess and the opposite edge having a tongue arranged to enter said recess to prevent relative displacement between the two adjacent edges of the blade, the side walls of said tongue and recess being substantially parallel to permit the ready insertion and removal of said tongue.

2. A hole saw blade comprising an annular split ring blade, one of the split ring edges of the blade having an elongated recess and the opposite edge having a projecting tongue of a greater length than the maximum spread of the blade and adapted to enter said recess, whereby considerable expansion is permitted in the split ring blade and at the same time relative vertical displacement between the edges of the blade is prevented, the side walls of said tongue and recess being substantially parallel to permit the ready insertion and removal of said tongue.

EDWARD E. THATCHER.